(12) United States Patent
Koseki et al.

(10) Patent No.: US 7,991,825 B2
(45) Date of Patent: Aug. 2, 2011

(54) METHOD, SYSTEM, AND APPARATUS FOR SUPPORTING PERSONAL SERVICE

(75) Inventors: Akira Koseki, Sagamihara (JP); Koichi Takeda, Machida (JP)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 12/394,415

(22) Filed: Feb. 27, 2009

(65) Prior Publication Data
US 2009/0222507 A1 Sep. 3, 2009

(30) Foreign Application Priority Data

Feb. 28, 2008 (JP) ................................ 2008-048749

(51) Int. Cl.
*G06F 15/16* (2006.01)
(52) U.S. Cl. .................... 709/202; 709/201; 709/206
(58) Field of Classification Search .................. 709/201, 709/202, 206
See application file for complete search history.

(56) References Cited

U.S. PATENT DOCUMENTS

| | | | | |
|---|---|---|---|---|
| 5,539,869 A * | 7/1996 | Spoto et al. | ................... | 715/207 |
| 6,263,402 B1 * | 7/2001 | Ronstrom et al. | ............ | 711/131 |
| 6,359,622 B1 * | 3/2002 | Hayes-Roth | .................. | 345/474 |
| 6,527,556 B1 * | 3/2003 | Koskinen | ...................... | 434/219 |
| 6,550,055 B1 * | 4/2003 | Cohen et al. | ................... | 717/124 |
| 7,143,135 B2 * | 11/2006 | Smith et al. | .................... | 709/204 |
| 7,590,603 B2 * | 9/2009 | Zhang et al. | ...................... | 706/12 |
| 2005/0055321 A1 * | 3/2005 | Fratkina et al. | ................. | 706/45 |
| 2007/0038586 A1 * | 2/2007 | Vaucois | .......................... | 706/14 |
| 2007/0082738 A1 * | 4/2007 | Fickie et al. | .................... | 463/42 |
| 2008/0263460 A1 * | 10/2008 | Altberg et al. | ................ | 715/757 |
| 2009/0164503 A1 * | 6/2009 | Jung et al. | ..................... | 707/102 |
| 2010/0121817 A1 * | 5/2010 | Meyer et al. | .................. | 707/623 |

FOREIGN PATENT DOCUMENTS

| | | |
|---|---|---|
| JP | 2001504960 | 4/2001 |
| JP | 2002133295 | 5/2002 |
| JP | 2007115259 | 5/2007 |

* cited by examiner

*Primary Examiner* — Phuoc Nguyen
(74) *Attorney, Agent, or Firm* — F. Chau & Associates, LLC; Gail H. Zarick, Esq.

(57) ABSTRACT

A personal service support method for assisting an inquiry about a user operation in a virtual world, a computer program product, and a system for the same. The method includes: storing a dialog between a user and an agent; connecting the dialog in a list structure with another dialog in the list structure to produce a created dialog in a branch tree structure; and recording the created dialog in the branch tree structure. The computer program product tangibly embodies instructions which when implemented causes a computer to execute the steps of the method. The system includes: a dialog storage unit which stores a dialog between a user and an agent; and a dialog creating unit which connects the dialog in the list structure with another dialog in the list structure to create a dialog in a branch tree structure.

18 Claims, 15 Drawing Sheets

METHOD, SYSTEM, AND APPARATUS FOR SUPPORTING PERSONAL SERVICE

CROSS-REFERENCE TO RELATED APPLICATIONS

This application claims priority under 35 U.S.C. §119 to Japanese Patent Application No. 2008-48749 filed Feb. 28, 2008, the entire contents of which are incorporated by reference herein.

BACKGROUND OF THE INVENTION

1. Field of the Invention

The present invention relates to a personal service support method, system, and apparatus for assisting inquiries about user operations in a virtual world.

2. Description of the Related Art

In a virtual world created on a computer, characters or objects representing users (hereinafter referred to as avatars) come into contact with various locations, scenes and objects, and build up experiences in communities in a virtual world like in the real world. However, when avatars do not have enough knowledge of new locations, scenes and objects, the avatars may need help and use various help techniques.

In addition, an avatar is provided with help mainly by other avatars such as avatars of other users and shop assistants around the avatar, and is likely to be provided with such help by through face-to-face dialog or interaction with another avatar. Therefore, what is required is a virtual world-specific help technique that enables avatars, such as avatars of other users and shop assistants around the avatar, to use an interactive help history.

In general an interactive help history is created mainly based on, for example, users' inquiry logs at a call center. To respond to an inquiry made by a user, texts and related items are extracted from the interactive help history using a technique such as a similarity search, and are presented as an answer to the user. The context of the extracted text and related items will be highly similar to the context of the user's inquiry. Various methods have been proposed for such a help technique.

For example, Japanese Patent Translation Publication No. 2001-504960 (hereinafter, referred to as Patent Document 1) provides a method of updating a knowledge base for answering inquiries. In the method according to Patent Document 1, a knowledge database contains statistical information on messages including inquiries or comments, answers to the messages, the number of inquiries and the like is used to automatically respond to the inquiries and the messages. Furthermore, in the method described in Patent Document 1, if it is not possible to respond with the knowledge database, the inquiries are provided to a subject matter expert or people on a help list created in advance, and then the subject matter expert updates the knowledge database.

Furthermore, Japanese Patent Application Publication No. 2002-133295 (hereinafter, referred to as Patent Document 2) describes a method and an apparatus for assisting people on a help list to provide quick responses to inquiries. In a manner similar to Patent Document 1, the method described in Patent Document 2 uses a knowledge database having statistical information on messages including inquiries or comments, answers to the messages, the number of inquiries and the like. The method described in Patent Document 2 involves: receiving the messages including inquiries or comments, which are described in emails; automatically transmitting the messages to experts when the knowledge database does not contain appropriate responses to the messages; and then having the subject matter experts respond to the messages.

Moreover, Japanese Patent Application Publication No. 2007-115259 (hereinafter, referred to as Patent Document 3) discloses a method for assisting users to perform their own duties, by using past inquiries and answers as well as experts' knowledge. In the method described in Patent Document 3, the stored contents of past inquiries and responses are stored as response record information pieces. Then, when a request to answer a new question is received from a user, certain response record information pieces are obtained and displayed on a screen watched by an answerer who answers the new question or the user who had asked the new question. Here, the response record information pieces thus obtained and displayed are in the field of designated duties that the user is responsible for, and have been created in response to question-answer requests from the user and other users.

However, the help histories used in the methods described in Patent Documents 1, 2 and 3 are created by simply storing users' inquiries and agents' answers to them, where an agent is a person or avatar who answers a question from a user. Consequently, users still face the problem in which the inquiries and answers are not stored in a reusable form. Furthermore, another problem is that because the help histories contain similar inquiries and answers, the information in the help histories is redundant. Moreover, all the methods described in Patent Documents 1, 2 and 3 use a similarity search on text information when obtaining answers from the help histories. However, the use of the help history is not suitable when obtaining answers from the help history in a virtual world because continuous changes in locations of objects targeted for questions and the objects in a virtual world cannot be described as search conditions.

In consideration of the above problems, the present invention provides a personal service support method, system, apparatus and computer program for assisting inquiries about user operations by use of dialog records of users' inquiries and agents' answers to the inquiries, the dialog records being obtained in a virtual world and edited in a reusable form.

SUMMARY OF THE INVENTION

In one aspect, the present invention provides a method for a personal service support that assists users with their inquiries about their operations or problems in a virtual world. The personal service support method includes the steps of: storing dialogs between the users and agents answering inquiries about the user operations in a virtual world; based on that, the stored dialogs have a list structure in which dialog units of the users and the agents are set as nodes and based on information on the nodes, connecting dialogs in the list structure to create a dialog in a branch tree structure; and storing the created dialog in the branch tree structure.

Another mode of this aspect provides the step of searching the stored dialog in the branch tree structure based on a certain condition requested by the user or the agent. According to this mode, the user can solve its problem by performing a search. Additionally, the agent can also search the stored branch tree structure, and can provide an answer at the request of the user by searching the branch tree structure even when the agent does not know the answer.

According to another mode of this aspect, information on the nodes is structured information on the contents and situation of a dialog. The "structured information on the situation of a dialog" is, for example, information on user and agent IDs which are used for a dialog, locations of the user and the agent, and objects around where the dialog is conducted.

According to this mode, it is possible to specify relevant dialogs based on the information and to connect them.

Another aspect of the present invention provides for a personal service support system and apparatus, and a computer program executed in a computer.

DETAILED DESCRIPTION OF THE PREFERRED EMBODIMENTS

The term "virtual world" means an environment that is created by a computer on a network, and can be two- and/or three-dimensional. "Dialog" means utterances given by avatars. One unit for this dialog is a period from a time when an avatar starts uttering words to a time when another avatar utters words. The term "list structure" means a data structure where data are connected in a chain or by a link so that the data could be sequentially followed. The term "branch tree structure" is one type of data structure where one or a plurality of data located in a level lower than a level to which one datum belongs are arranged in a branched form. In the "branch tree structure", each level has a parent-child relationship.

A parent has one or a plurality of children, and a child thereof can further have one or more children with itself as the parent. However, a child does not have a plurality of parents. Note that the branch tree structure includes the list structure, which is a special case, that is, a case where there is always one branch only.

In this aspect of the present invention, dialogs and interactions can be systematically stored because redundant dialogs can be deleted by connecting list-structured dialogs between users and agents to create dialogs in the branch tree structure. Moreover, dialogs can be looked up both normally and in reverse by creating dialogs in the branch tree structure.

Figure 1:
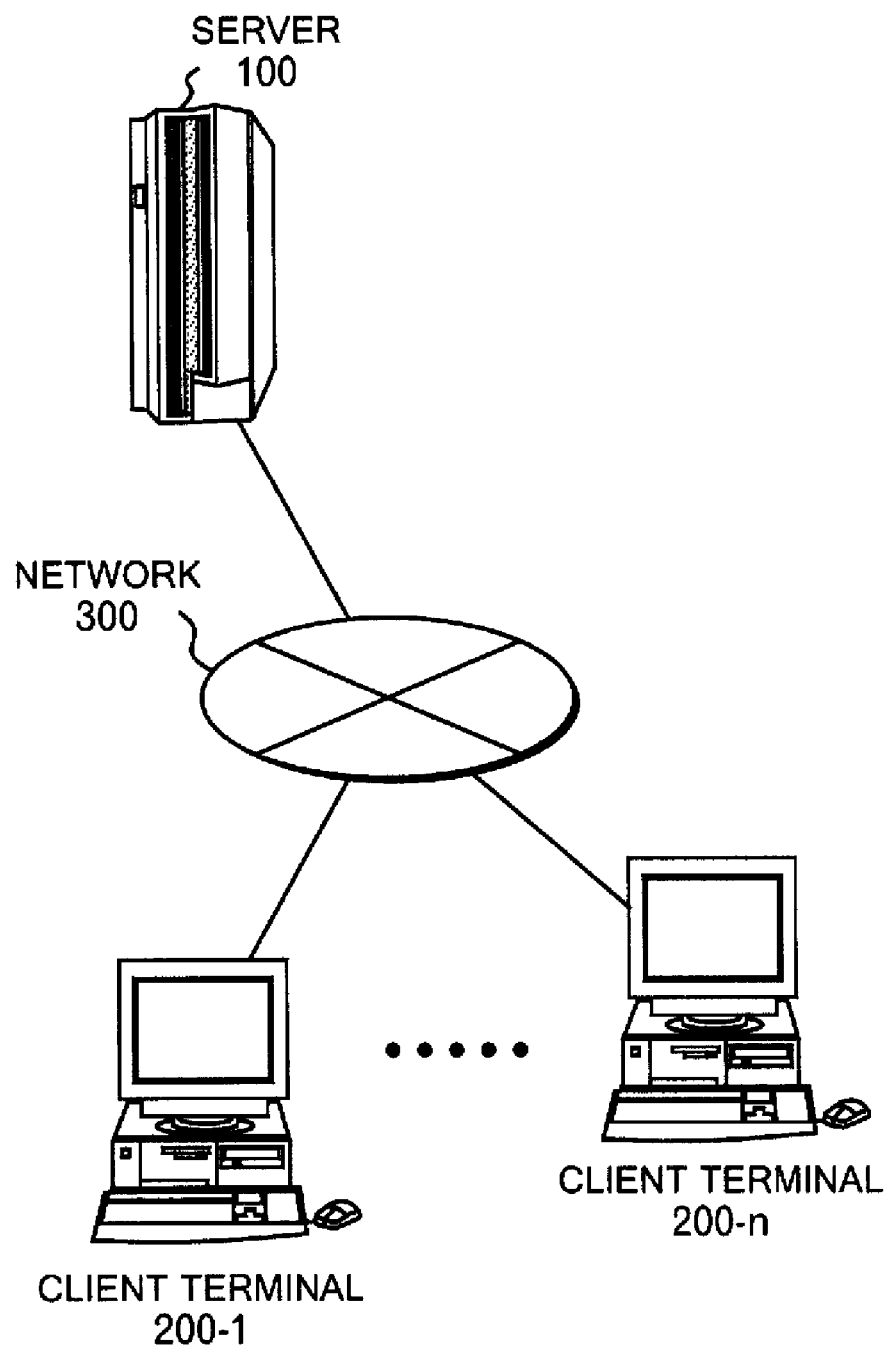
FIG. 1 shows a configuration of one aspect of a service support system to which the present invention is applied.

FIG. 1 shows a configuration of a service support system 1 of an embodiment, to which the present invention is applied. Client terminals 200-1, 200-2, . . . , 200-n are connected to a network 300 represented by the Internet and an intranet such that they are capable of performing transmission and reception to and from a server 100. (Hereinafter, the client terminal of a user is set as 200-1, and the client terminal of an agent is set as 200-2. If there is no need for distinguishing the user's client terminal 200-1 from the agent's client terminal 200-2, they are simply called the client terminal 200.) Additionally, the user client terminal 200-1 and the agent client terminal 200-2 can exchange information via the network 300 and the server 100. Note that the server 100 in this configuration is not necessarily configured of one, but can be configured of a plurality of servers.

Figure 2:
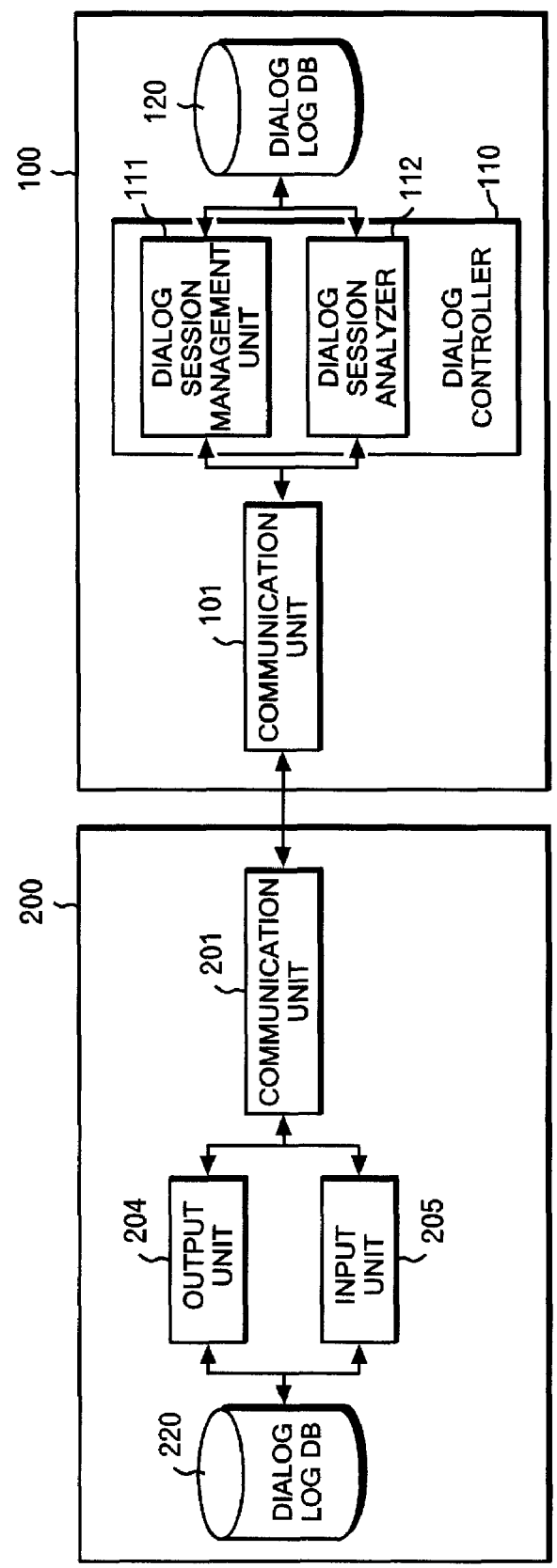
FIG. 2 shows a basic system configuration diagram of a client terminal and a server of the service support system according to an embodiment.

FIG. 2 shows a basic system configuration diagram of the client terminal 200 and the server 100 of the service support system 1 according to the present embodiment. The server 100 includes a communication unit 101, a dialog controller 110, and a dialog log database 120 (hereinafter, a database is referred to as DB). The dialog controller 110 has a dialog session management unit 111 and a dialog session analyzer 112. On the other hand, the client terminal 200 includes a communication unit 201, an output unit 204, an input unit 205, and a dialog log DB 220. Note that the client terminal 200 can have the dialog session management unit and the dialog session analyzer, too. Although the dialog log DB is provided to each of the server 100 and the client terminal 200 in FIG. 2, the dialog log DB does not have to be provided for both of them.

The communication units 101 and 201 transmit and receive (i) information on a dialog between the user client terminal 200-1 and the agent client terminal 200-2 and (ii) information on an operation from the client terminal 200 to the server 100. The dialog session management unit 111 obtains a dialog log between the user and the agent, and edits the dialog log. The dialog session analyzer 112 searches for dialog logs at the request of the user or the agent.

The dialog log DB 120 of the server 100 and the dialog log DB 220 of the client terminal 200 record the dialog logs of questions and answers between the user and the agent. The dialog log DB 120 of the server 100 stores dialog logs of various events by recording dialog logs between multiple users and multiple agents. On the other hand, because the dialog logs are referenced to by multiple users and multiple agents, it is necessary, from the viewpoint of the personal information protection, to exclude personal information such as names and addresses from dialog logs to be stored in the dialog log DB 120 of the server 100. In addition, in order to disclose a dialog to an unspecified number of users and agents, it is sometimes necessary to get a permission of a user who participated in that dialog, upon storage of the dialog in the dialog log DB 120. Moreover, the dialog log DB 120 of the server 100 can be divided into specified categories. For example, multiple dialog log DBs 120 can provide the dialog log DBs 120 to each location in the virtual world.

On the other hand, the dialog log DB 220 of the client terminal 200 stores only dialog logs related to the user or the agent of the client terminal 200 having the dialog log DB 220 of the client terminal 200, and is referred to only by the user or the agent of the client terminal 200. Hence, dialog logs stored in the dialog log DB 220 of the client terminal 200 can include personal information so that it is possible to store dialogs as they are. Furthermore, although various events are not stored, dialogs can be stored as they are. Accordingly, it is possible to use the dialogs as specific Frequently Asked Questions (FAQ). Hereinafter, when referring to the dialog log DB, unless otherwise stated, the dialog log DB indicates any of the dialog log DB 120 of the server 100, the dialog log DB 220 of the user client terminal 200-1, and the dialog log DB 220 of the agent client terminal 200-2.

The communication unit 101 is an example of a receiver, the dialog log DBs 120 and 220 are examples of dialog storages, the dialog session management unit 111 is an example of a dialog creating unit, and the dialog session analyzer 112 is an example of a dialog search unit. Note that storage is not limited to DBs on a hard disk, but can be external storage such as a memory, a magnetic tape, or a flexible disk. Descriptions of the hardware configurations of the server 100 and the client terminal 200 will be later provided.

The user is a person who asks a question, and the agent is a person who answers the question from the user. It is possible that a person who is a one-time user becomes the agent and that a person who is a one-time agent becomes the user. Each user and agent has an avatar representing themselves in the virtual world, and can exchange questions and answers through chats, using, for example, texts or audio, between the avatars.

Figure 3:
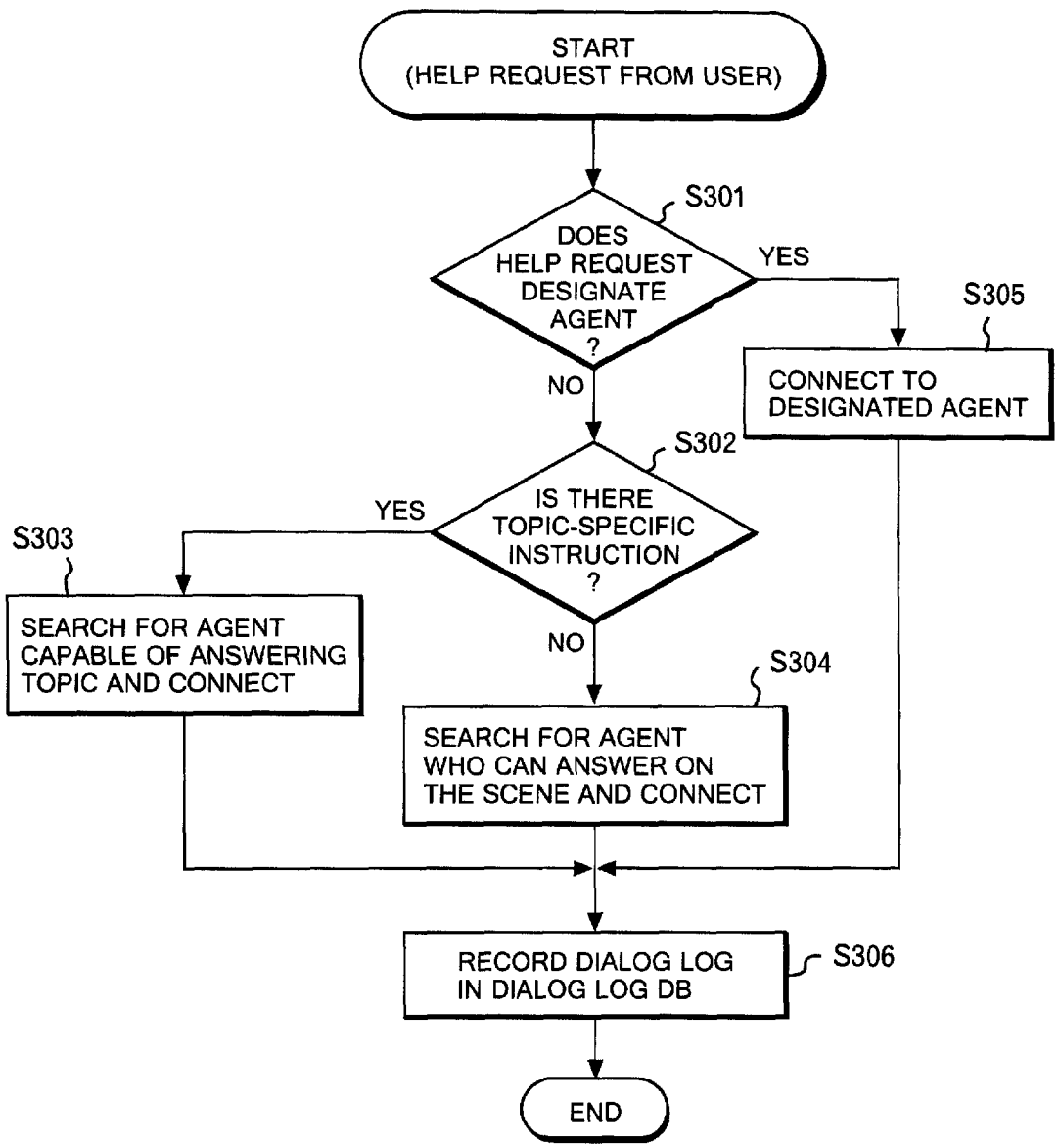
FIG. 3 is a flow chart of a process for obtaining a new dialog log.

FIG. 3 is a flow chart of a process for obtaining a new dialog log. The processing starts when a help request (an inquiry about user operation) inputted to the input unit 205 of the user client terminal 200-1 is transmitted to the dialog controller 110 of the server 100 via the communication units 201 and 101. The user can make help requests in various forms. For example, a help request can automatically be made by asking a question through a chat or by doing a certain action.

In Step S301, the dialog controller 110 determines whether or not the help request of the user specifies an agent. The user can have a dialog with an agent who has given a good impression from a past dialog or who is well-known, for example, by specifying an agent. When the agent is specified, the dialog controller 110 connects the user to the specified agent (Step S305). On the other hand, when the agent is not specified, the dialog controller 110 determines whether or not there is a designation of specific topic (Step S302). The specific topic is extracted from a question from the user. For example, when a question of "I am looking for the shoes of XX brand" is made on a shoe sales website, "xx brand" and "shoes" are extracted as specific topics therefrom.

When a specific topic is designated, the dialog controller 110 searches an agent list for an agent who can answer questions on the topic, and connects the user to the agent (Step S303). The agent list is a list of people who are enrolled as agents on the website, and contains information on topics and the like with which the agents are familiar. Moreover, the agents who can answer are those who have logged in the virtual world and can chat with agents enrolled on the agent list. In contrast, when a specific topic is not designated, the dialog controller 110 searches the agent list for an agent who can answer on the scene and connects the user to the agent (Step S304).

When the agent and user, connected by the dialog controller 110 through Steps S303, 304, and 305, engage in a dialog and the dialog finishes, the dialog session management unit 111 stores the dialog log in the dialog log DB (Step S306) and the processing ends. During the dialog between the user and the agent, the dialog session management unit 111 temporarily stores the dialog log in the dialog controller 110.

The dialog log contains information on a dialog, the contents of utterances, and information on the utterances. The dialog session management unit 111 obtains, as the information on the dialog, information on a user ID, an agent ID, a topic, and the like, upon the start of the dialog. These pieces of information are stored in the dialog log DB while being associated with the first utterance of the dialog log. Information on the dialog, such as the user ID, are used as keywords for searching for dialog logs, or as keywords for merging dialog logs, which will be described later.

In addition, the dialog session management unit 111 obtains, as the contents of and information on the utterances for each user and agent, information that includes a time of utterance, a location of utterance, an object in proximity to the utterance location, the moves of the user and the agent, and the actions of the user and the agent. These pieces of information are stored in the dialog log DB while they are being associated with the utterances. Similarly, the information on the user ID and the like are used as keywords for searching for dialog logs, or as keywords for merging dialog logs, which will be described later. Moreover, the contents of the utterance and actions are used in order for the user to solve a problem by itself, or in order for the agent to answer a question.

The information on the dialogs of the dialog log contains virtual world-specific information such as objects on a dialog location and its proximity to the dialog location. This is because a help request of the user and an answer of the agent, made in the virtual world, relate to virtual world-specific information. For example, assume a situation where a user is visiting a website of a shop to look at products and makes a help request of explanation for a product A. When the user engages in a dialog with the agent in front of product A, the dialog about product A closely relates to the situation of where the dialog location is in front of product A.

Figure 4:
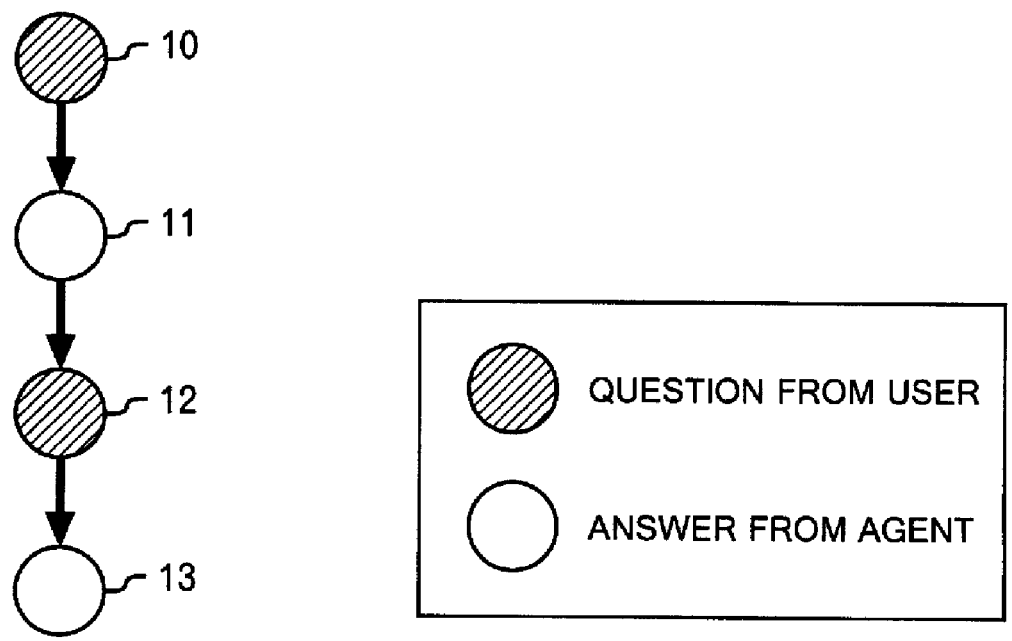
FIG. 4 is a configuration diagram of a dialog log where an utterance in a dialog is replaced as a node.

FIG. 4 is a configuration diagram of a dialog log where one utterance in a dialog is replaced with one node. In this configuration, an answer 11 from the agent is given to a question 10 from the user, and a question 12 from the user is further given to the answer 11 from the agent. As shown in FIG. 4, the dialog is shown with a directed graph in which, while setting one utterance of the user and the agent as one node, a directional line connects between nodes. The reason why it is possible to connect a directional line between nodes is because a relative order among the nodes is determined by giving the next utterance based on the previous utterance of the user or the agent. Moreover, the dialog has a list structure with no-branch, where the utterances of the user and the agent appear in turn. In the dialog log, information on a dialog is attached to a start node, and the contents of utterances and information on utterances are attached to each of the nodes.

The dialog logs stored in the dialog log DB contain dialog logs including questions with the same contents and dialog logs about the same objects, and dialog logs are accordingly stored redundantly in the dialog log DB. In addition, when different answers are given to questions with the same contents, the dialog logs are stored in the dialog log DB as different dialog logs. Hence, it is difficult for the user and the agent to reuse the dialog logs effectively.

In this respect, by organizing dialog logs systematically stored in the dialog log DB, it becomes possible to avoid the redundancy of search results obtained by the user and the agent searching the dialog log DB for answers to questions, and to thereby reuse the dialog logs effectively. Systematic dialog logs can be created, from the dialog logs stored in the dialog log DB, by editing dialog logs in the list structure to have the branch tree structure.

Figure 5:
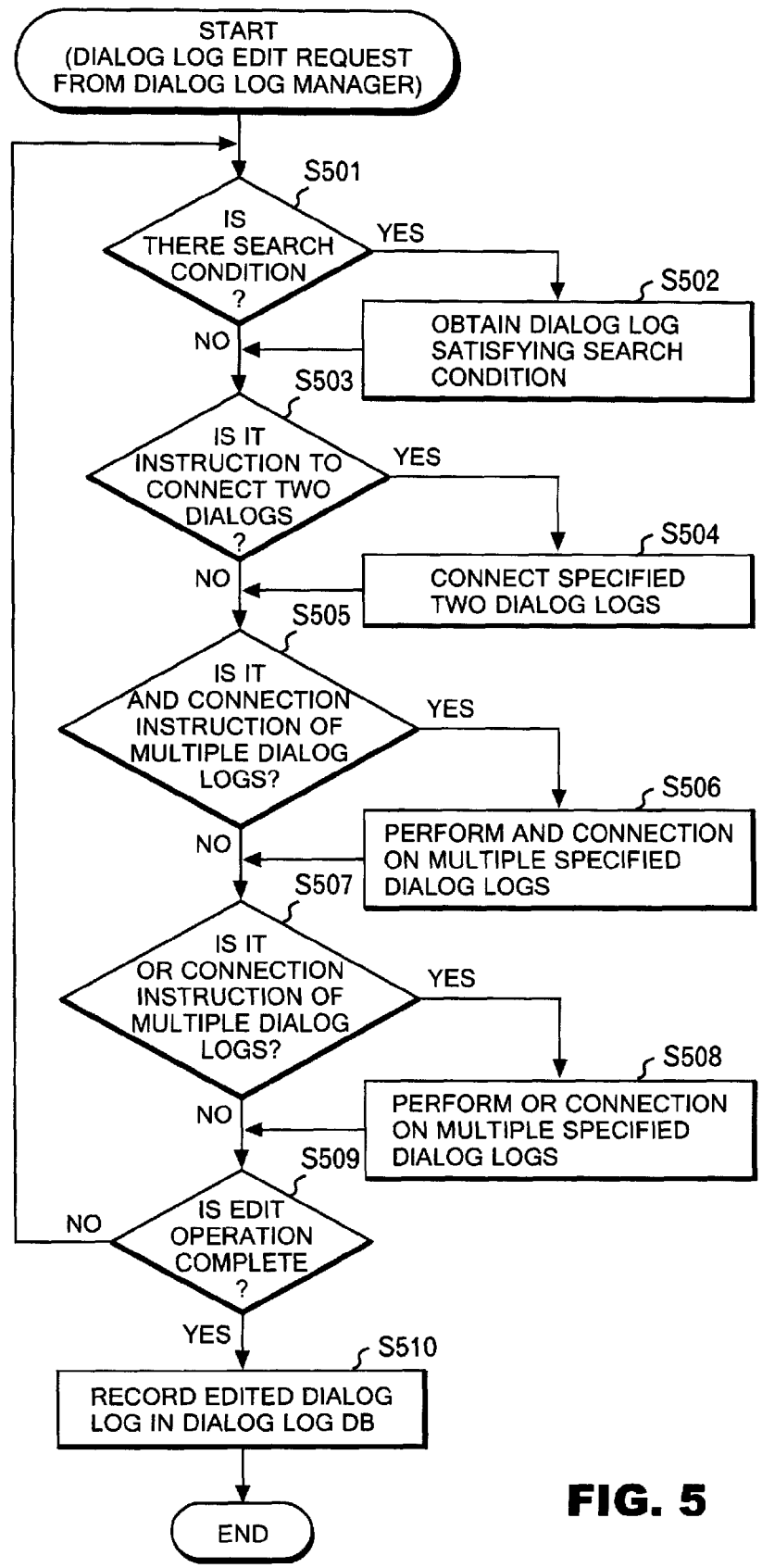
FIG. 5 is a flow chart of an editing process of a dialog log stored in a dialog log DB.

A dialog log in the branch tree structure is created by a dialog log DB administrator editing dialog logs stored in the dialog log DB. FIG. 5 is a flow chart of a process of editing dialog logs stored in the dialog log DB. The processing starts when a dialog log edit request of the dialog log DB administrator is transmitted to the dialog session management unit 111. In the case of editing dialog logs stored in the dialog log DB 120 of the server 100, the dialog log DB administrator is a server manager. In the case of editing dialog logs stored in the dialog log DB 220 of the client terminal 200, the dialog log DB administrator is a manager of a client terminal thereof, that is, the user or the agent. In Step S501, the dialog session management unit 111 determines whether or not the dialog log edit request of the dialog log DB administrator sets a search condition of a dialog log. In the search condition, a user ID, objects in proximity to a dialog location, and the like are specified and stored in the dialog log in combination with a dialog.

If the request has a search condition, the dialog session management unit 111 searches the dialog log DB, and obtains dialog logs fulfilling the search condition (Step S502). Dialog logs can be narrowed down to be edited by specifying a search condition. If there is no search condition, all dialog logs stored in the dialog log DB are targeted for editing. Next, the dialog session management unit 111 determines whether or not the dialog log edit request contains an instruction to connect two dialog logs (Step S503). Two dialog logs to be connected are specified by the dialog log DB administrator. The connection instruction can be followed, for example, by displaying the dialog logs targeted for editing on the display, and the dialog log DB administrator selecting two dialog logs to be connected from among the dialog logs displayed, and specifying the connection point of the two dialog logs. If the dialog log edit request contains the instruction to connect two dialog logs, the dialog session management unit 111 connects specified two dialog logs (Step S504).

There are three patterns for the connection of two dialog logs. The first pattern is to connect an end node of a first dialog, dialog log 1, and a start node of a second, dialog log 2. The second pattern is to integrate a dialog into another dialog. Lastly, the third pattern is to merge the same nodes of dialog logs 1 and 2 and create a branch tree.

Figure 6:
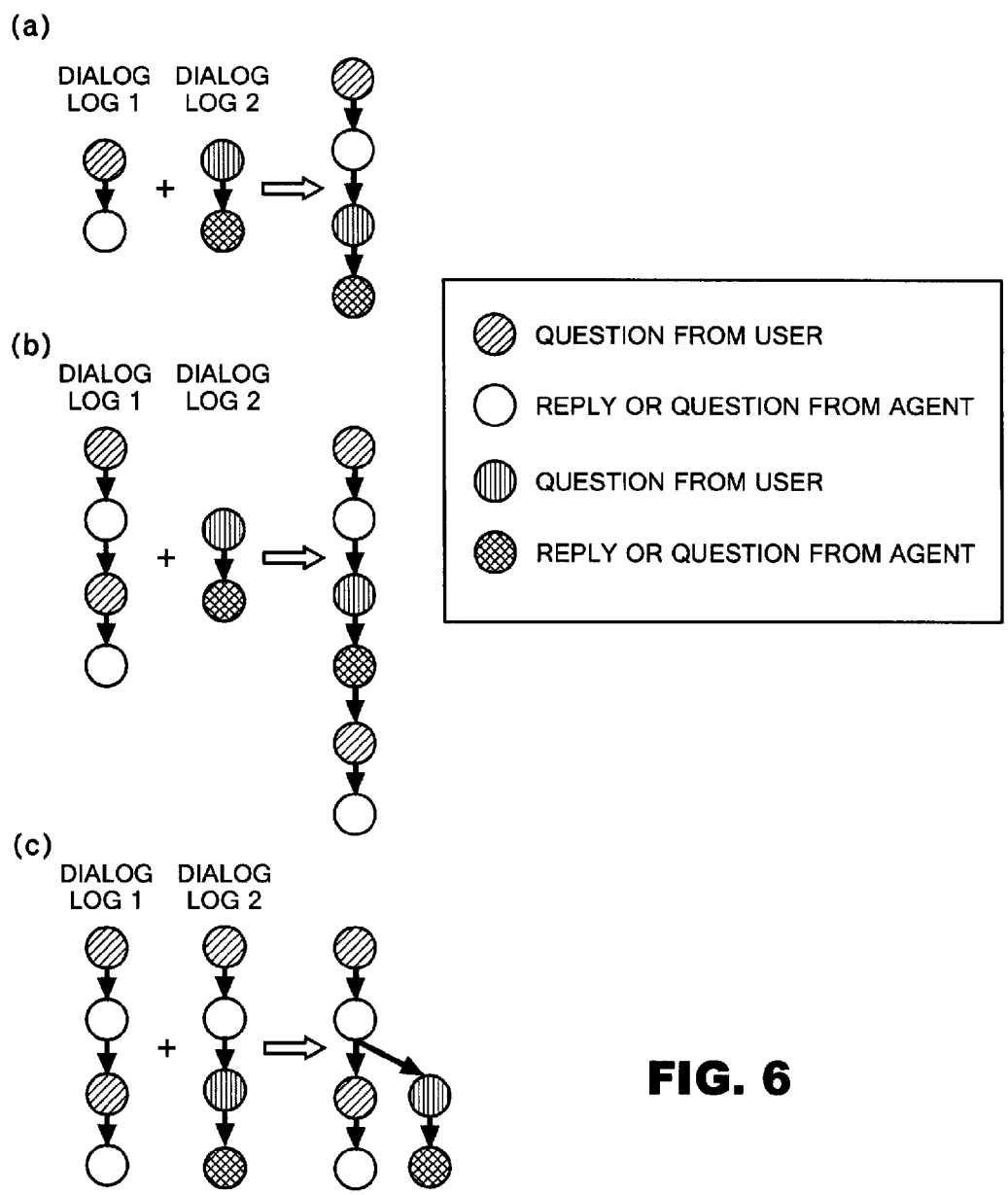
FIGS. 6A, 6B and 6C show connection patterns.

FIGS. 6A, 6B, and 6C show the connection patterns. FIG. 6A shows the first pattern in which the end node of dialog log 1 and the start node of dialog log 2 are connected. Dialog logs 1 and 2 are connected by connecting the end node of dialog log 1 and the start node of dialog log 2 with a directional line. The dialog log DB administrator performs the connection of the first pattern in a case, for example, where the location information of dialogs of the end node of dialog log 1 and of the start node of dialog log 2 are the same or in a case where objects in proximity to the dialog location are the same.

Specifically, the first pattern is performed when both of the dialog logs 1 and 2 are dialogs about a location A, or when both of the dialog logs 1 and 2 are dialogs conducted at the time of purchasing a product B. However, the contents of the dialogs need to be different because there is no point in repeating dialogs with the same content. Furthermore, the connection of the first pattern is conducted also in a case where the location information of the user or the agent held by the end node of the dialog log 1 is connected with the location information of the user or the agent held by the start node of the dialog log 2. Specifically, where there are neighboring stations A and B, the location information of the end node of the dialog log 1 is station A, and the location information of the start node of the dialog log 2 is station B. The first pattern is also performed in this case because the neighboring locations may have some relation. It is possible to connect a plurality of short dialog logs and create one new long dialog log by connecting two dialog logs in this manner.

FIG. 6B shows the second pattern in which dialog log 2 is integrated into dialog log 1. The connection of the second pattern can be performed by inserting dialog log 2 between nodes of dialog log 1, and connecting them with a directional line. The dialog log DB administrator conducts the connection of the second pattern in a case, for example, where the start node of dialog log 2 has a subordinate relation to a certain node of dialog log 1, specifically, in a case where dialog log 1 is about product A, and dialog log 2 is about a term used in the dialog log 1. A position to insert dialog log 2 is determined by the dialog log DB administrator who connects the dialogs.

FIG. 6C shows the third pattern in which a branch tree is created by merging nodes corresponding to the same question in dialog logs 1 and 2. When connecting dialog log 2 to dialog log 1, a branch tree is created by connecting a list structure below a node corresponding to the same question of dialog log 2 as dialog log 1, to a position below a node corresponding to the same question of dialog log 1. Conversely, dialog log 1 can be connected to dialog log 2. The dialog log DB administrator conducts the connection of the third pattern in a case, for example, where dialog logs 1 and 2 are dialogs about the same topic, and different answers were given to the same question in dialog logs 1 and 2. Specifically, this is a case where answers "Yes" and "No" are given in response to a question of "is this your first time shopping here?" in a dialog to inquire a method for purchasing the product A.

Returning to FIG. 5, the dialog session management unit 111 determines in Step S505 whether or not the dialog log edit request is an AND connection instruction of a plurality of dialog logs. If the dialog log edit request is the AND connection instruction of a plurality of dialog logs, the dialog log session management unit 111 performs an AND connection on the plurality of specified dialog logs (Step S506). The AND connection is for explicitly expressing that all of the plurality of specified dialog logs need to be executed. The plurality of dialog logs to be connected is specified by the dialog log DB administrator in Step S506, similarly to Step S503.

Figure 7:
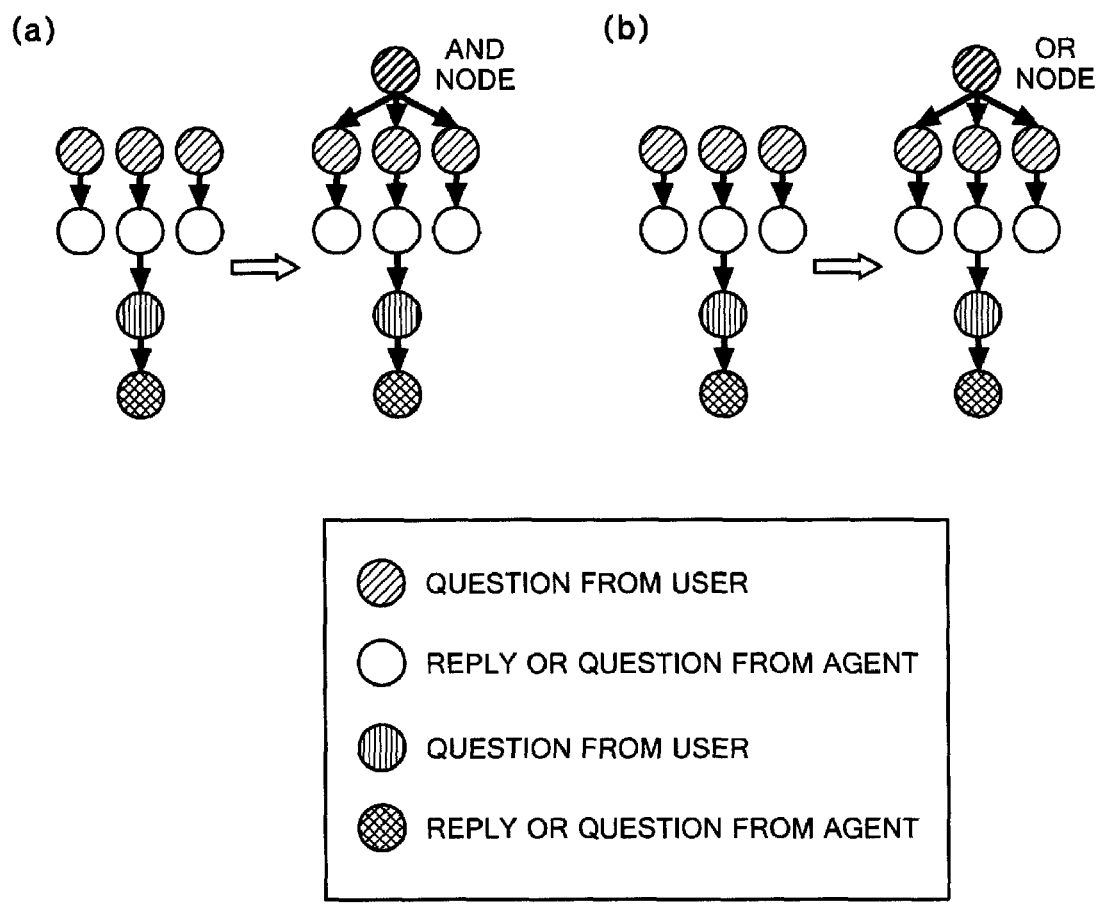
FIGS. 7A and 7B show an AND connection and an OR connection, respectively.

FIGS. 7A and 7B shows the AND connection and an OR connection. FIG. 7A shows a method for creating the AND connection. The dialog log DB administrator creates a branch tree in which an AND node is created as a parent node for a plurality of dialog logs to which the connection instructions have been given and the dialog logs are connected to the parent node. The parent node is associated with information common to the plurality of connected dialog logs. For example, if the user IDs of the specified dialogs are the same, the parent node is associated with the user ID. In this manner, it is possible to use the branch tree for searches for memorandums of the user and for agents dialoging with high frequency by merging the past dialogs of the same user into one.

The dialog session management unit 111 next determines whether or not the dialog log edit request is the OR connection instruction of a plurality of dialog logs (Step S507). If the dialog log edit request is the OR connection instruction of a plurality of dialog logs, the dialog log session management unit 111 performs the OR connection on the plurality of specified dialog logs (Step S508). The OR connection is for explicitly expressing that only one dialog among all of the plurality of specified dialog logs needs to be executed.

FIG. 7B shows a method for creating the OR connection. The dialog log DB administrator creates a branch tree in which an OR node is created as a parent node for a plurality of dialog logs to which the connection instructions have been given and the dialog logs are connected to the parent node. As in the case of the AND connection, the parent node is associated with information common to the plurality of connected dialog logs. A FAQ can be created about a certain object by collecting dialogs about the object and by setting the OR node as the parent node to create the branch tree.

The dialog session management unit 111 next determines whether or not the dialog log DB administrator has completed the editing of the dialogs (Step S509). If the editing of the dialogs is complete, the dialog session management unit 111 stores the edited dialog log in the dialog log DB (Step S510), and the processing is terminated. If the editing of the dialogs is not complete, the processing returns to Step S501 to repeat the process of editing dialog logs. Although the edited dialog log is stored in the same dialog log DB as pre-edited dialog logs in Step S510, only the dialog log DB administrator can search for the pre-edited dialog logs while the user and the agent can search only the edited dialog log. In this manner, it is possible for the user and the agent to refer to only the edited dialog log. However, the dialog log DB administrator in the client terminal 200 is the user or the agent. Accordingly, both of the pre-edited and edited dialog logs are referred to. It is possible to control the contents of the dialog log DB before and after editing by using the duplication of the pre-edited dialog logs for the edited dialog log, or by deleting the original dialog logs and leaving only the edited dialog log.

As described above, edited dialog logs, which are created from dialog logs stored in the dialog log DB, are used in order for the user to solve a problem by itself or in order for the agent to answer a question.

If there is a plurality of branches from a certain node in the above-mentioned process of editing dialog logs stored in the dialog log DB, it is possible to set a node explicitly created to a node corresponding to AND by setting the node to OR as default. In such a case, for example, a branch node in the description of a dialog about an object in proximity to a dialog location is considered to be an OR node, so that it is sufficient to connect the subsequent branch tree to the corresponding node. Therefore, it is possible to standardize the operation of connection to a node and to automatically perform a part of the editing process by setting a branch node to OR as default. In this manner, if the human operations are standardized, the editing operations can be automated. Additionally, by employing a mechanism which adds scores to dialog logs to be edited or merged, it is possible to reduce the human operations by automatically presenting the merging result of the maximum score. The merging indicates the connection processes in Steps S503, S505, and S507 shown in FIG. 5.

Figure 8:
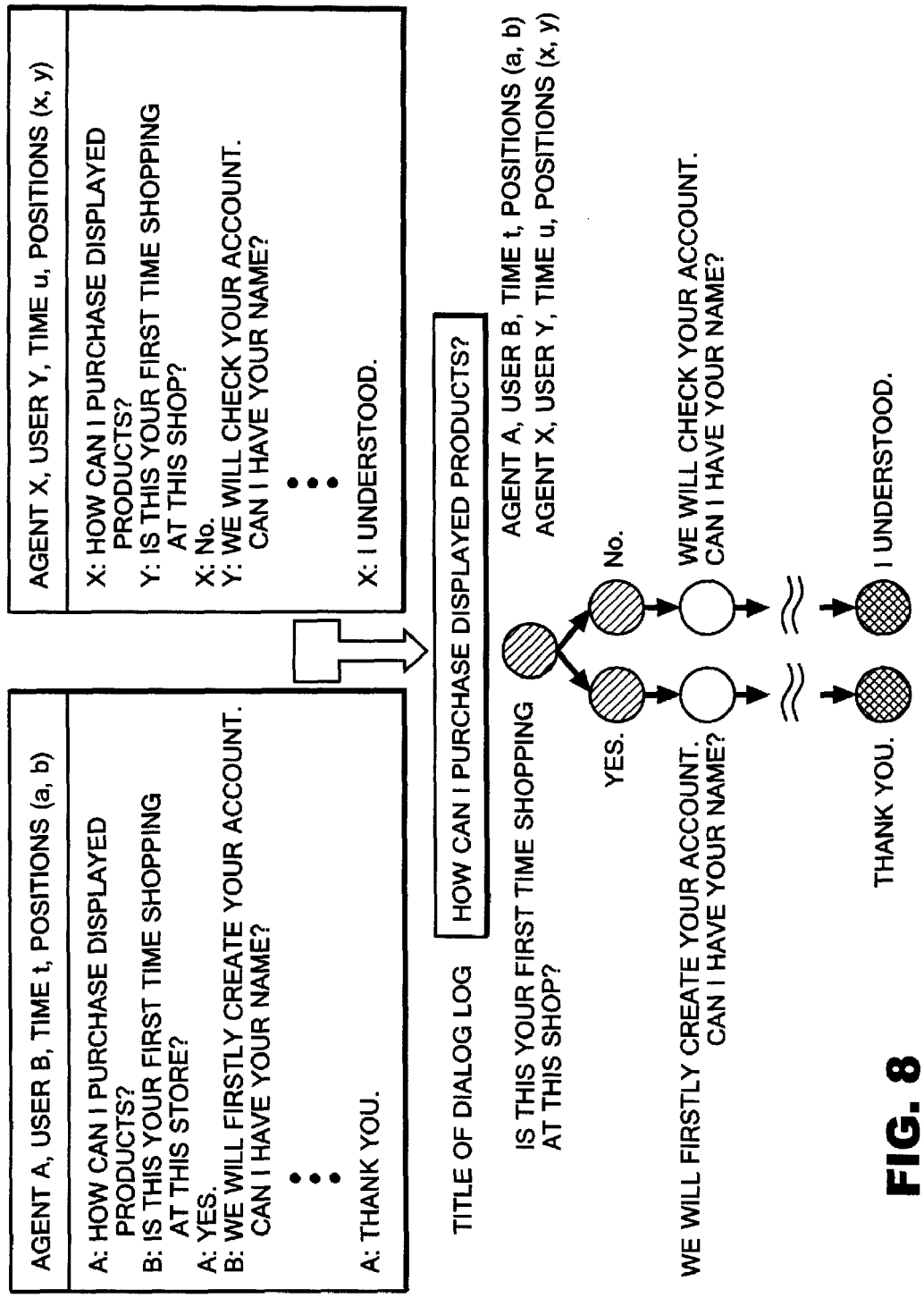
FIG. 8 shows a specific example of a process of connecting two dialog logs.

FIG. 8 shows a specific example of a process of connecting two dialogs. Used as examples are a dialog log between an agent A and a user B (hereinafter referred to as the dialog AB) and a dialog log between an agent X and a user Y (hereinafter referred to as the dialog log XY). Because the first question of "How can I purchase displayed products?" from the user and a follow-up question of "Is this your first time shopping at this store?" from the agent are common to dialog logs AB and XY, the dialog log DB administrator edits dialog logs AB and XY by connecting them. The connection performed here is the third pattern.

When editing the dialogs, the dialog log DB administrator can add a header to the dialog logs. The header is associated with a start node of the dialogs. A header can be added, for example, by setting the first question as its header if it is a dialog log to answer a user's question, or by setting the name of a certain object as its header if it is a dialog log about the object. Adding a header enables the dialog log DB administrator to understand the contents of the dialog logs at a glance, making it easy to edit the logs and delete repetitions. In FIG. 8, the first question of "How can I purchase displayed products?" from the users in dialog logs AB and XY is added to the dialog logs as a header. Because the first question is set as the header, it is not included in the nodes of the dialog logs.

Dialog logs AB and XY have different answers of "Yes" and "No" in response to the question of "Is this your first time shopping at this store?" Therefore, the node of the question is set to OR to associate the branch trees of the two different answers. In this manner, it is possible to edit the dialog logs in the case of "How can I purchase displayed products?" and to thereby systematically compile the questions from the users under the two scenarios where it is and where it is not the first time shopping at the store.

Figure 9:
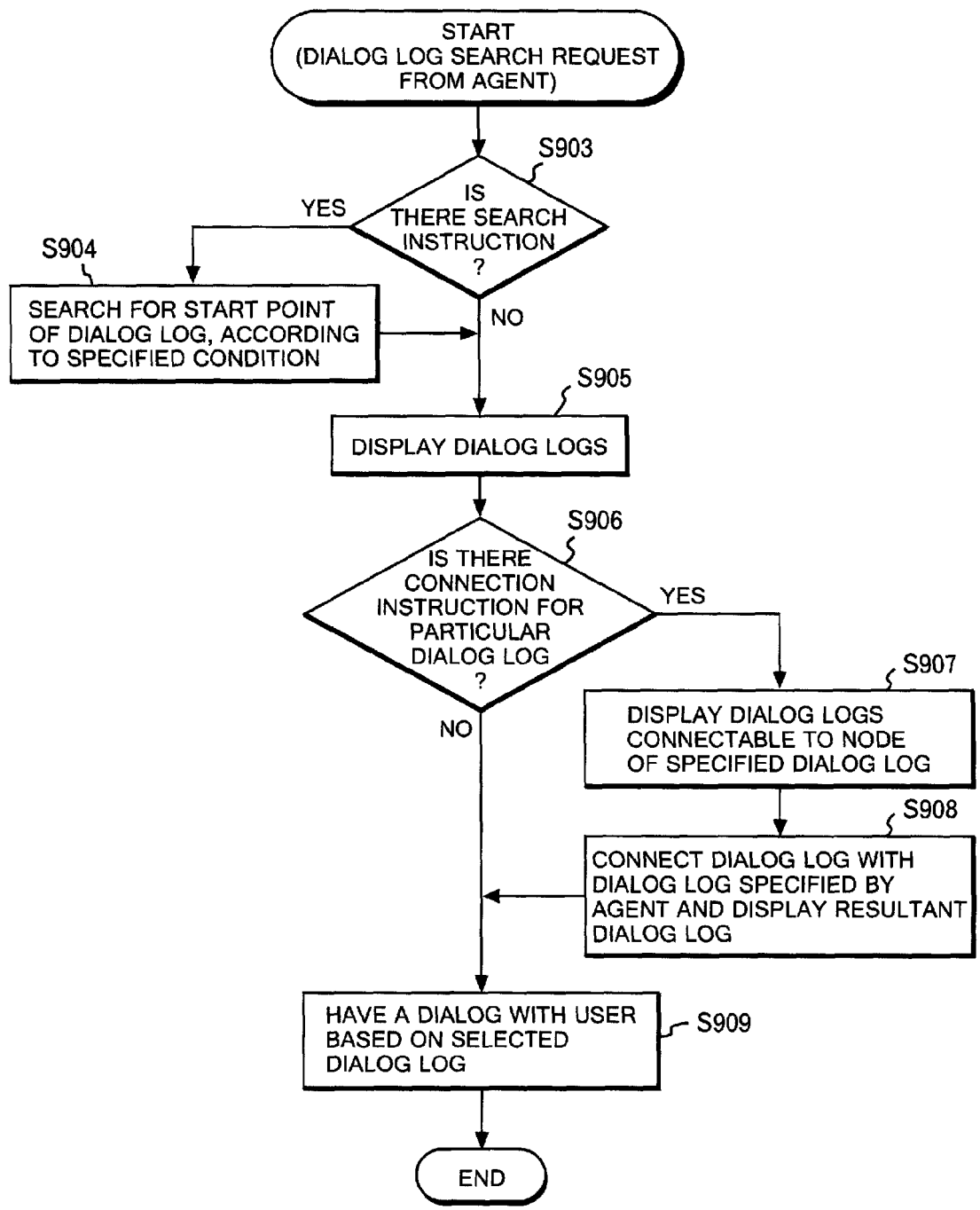
FIG. 9 is a flow chart of a dialog log search process of a merging process at the request of the agent.

FIG. 9 is a flow chart of a dialog log search process and a merging process performed at the request of an agent. Anybody can be an agent by using a dialog log to engage in a dialog with the user. To perform the dialog log search process and the merging process at the request of the agent, it is possible to use the dialog log DB 220 included in the agent client terminal 200-2 and the dialog log DB 120 included in the server 100. When using the dialog log DB 120 included in the server 100, the agent uses the edited dialog log. On the other hand, when using the dialog log DB 220 included in the agent client terminal 200-2, both of the dialog logs before and after editing are used.

First, the dialog session analyzer 112 determines whether or not a dialog log search request of the agent has a conditional search instruction (Step S903). The search condition specified here is assumed to be information associated with start nodes of dialog logs, such as keywords, locations, objects, avatars' actions, and the like. In addition, a plurality of search conditions can be set down. Because this is a search to narrow down dialog logs, the agent can determine a search condition freely.

When there is a conditional search instruction, the dialog session analyzer 112 searches for information associated with the start nodes of dialog logs on a specified condition (Step S904). For example, if "product A" is set as a condition, all dialog logs are obtained which include the product A in the information associated with the start nodes. In Step S905, the dialog controller 110 displays the obtained dialog logs on the output unit 204 such as a liquid crystal display, of the agent client terminal 200-2. If the dialog log search request of the agent includes a conditional search instruction, the dialog logs of the search result of Step S904 are displayed. If the dialog log search request of the agent does not have a conditional search instruction, all dialog logs stored in the dialog log DB are displayed. A dialog log used is selected from among the dialog logs displayed on the display, and the dialog with the user is performed based on the selected dialog log.

Next, the dialog session analyzer 112 determines whether or not there is a connection instruction from the agent in a specific dialog log(Step S906). While conducting a dialog, the agent can connect dialog logs. For example, when the user requests for the agent for guidance around a location A and arrives at a location B following such guidance and the user then requests for guidance around location B, the specific dialog log is a dialog log on which the agent performed the connection. The connection instruction here is the above-mentioned first pattern.

If there is a connection instruction from the agent in Step S906, the dialog session analyzer 112 displays dialog logs which can be connected to an end node of the dialog log specified by the agent (Step S907). Based on the displayed dialog logs, the agent performs the connection of the dialog logs. The dialog log is displayed by being connected with a dialog log specified by the agent (Step S908). Because the dialog logs include many short dialogs, it is desirable for the agent to connect dialog logs as needed and use the connected dialog logs to engage in a dialog with the user. If there is a connection instruction from the agent, a dialog is conducted with the user based on the dialog log connected by the agent. If there is no connection instruction, a dialog is conducted based on the dialog log selected by the agent from the dialog logs displayed in Step S905 (both cases in Step S909).

Figure 10:
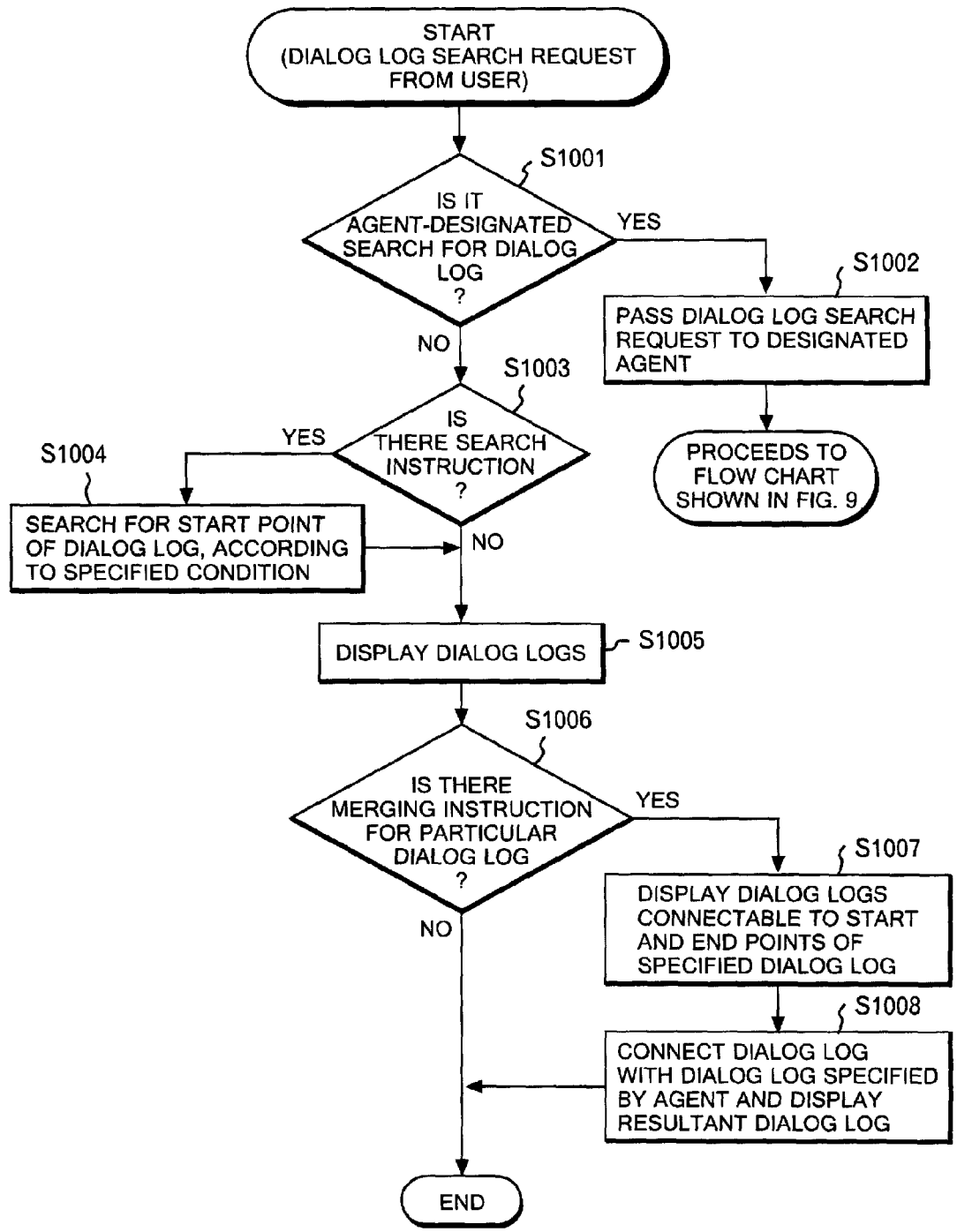
FIG. 10 is a flow chart of the dialog log search process and the merging process at the request of a user.

FIG. 10 is a flow chart of the dialog log search process and the merging process at the request of the user. The dialog session analyzer 112 first determines whether or not it is a dialog log search that designates an agent (Step S1001). If the agent is designated, the dialog session analyzer 112 passes the search request to the dialog session analyzer 112 of the client terminal 200-2 of the specified agent (Step S1002). When the search request is passed to the dialog session analyzer 112 of the client terminal 200-2 of the specified agent, the above-mentioned processing from Steps S903 to S909 in FIG. 9 is performed.

If the agent is not designated, the dialog session analyzer 112 performs the processing from Steps S1003 to S1008, which is the same as the processing from Steps S903 to S908 in FIG. 9. However, they are different in that the processing shown in FIG. 9 obtains dialog logs from the dialog log DB 220 in the agent client terminal 200-2 or the dialog log DB 120 in the server 100 while the processing shown in FIG. 10 obtains dialog logs from the dialog log DB 220 in the user client terminal 200-1 or the dialog log DB 120 in the server 100. Note that Steps S1003 to S1008 are the same as self-help functions provided by conventional websites.

When solving a problem, the user needs to select whether to solve the problem by using dialog logs or by having a dialog directly with the agent. However, it is possible to change to the use of dialog logs if the designated agent is absent, and to change to a direct dialog with the agent if it has not been possible to obtain a concise answer from the dialog.

Figure 11:
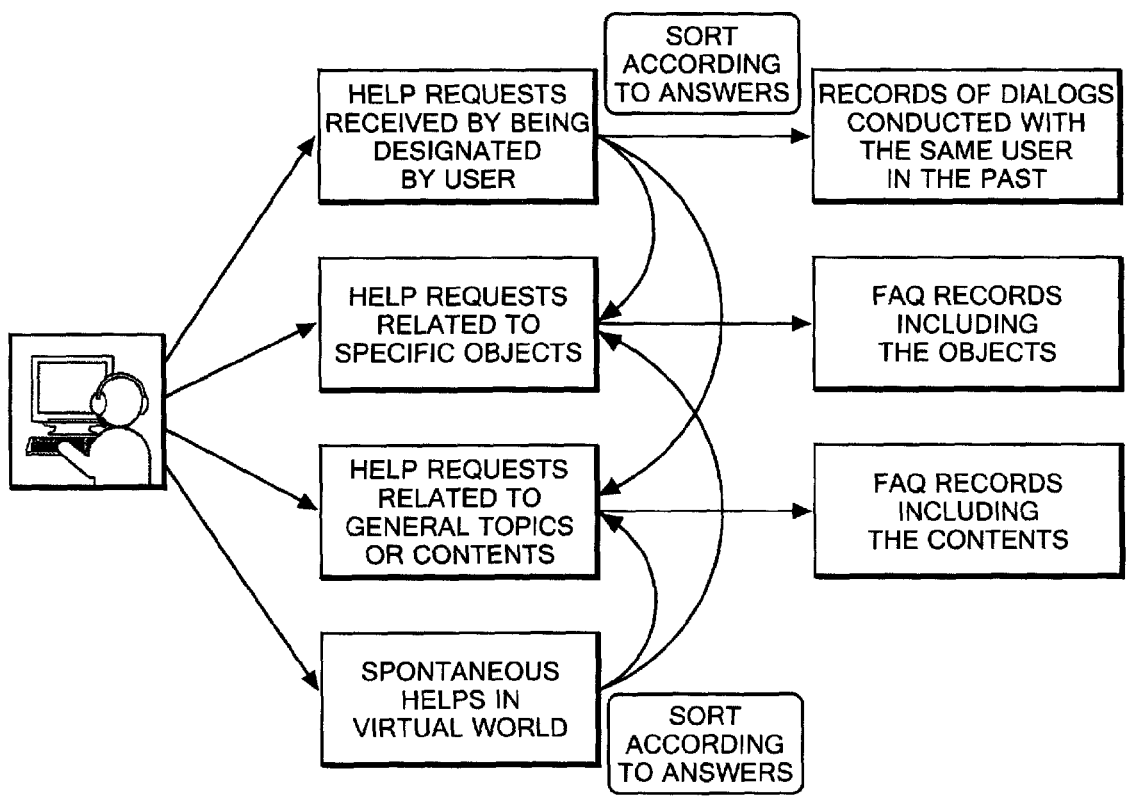
FIG. 11 shows an example of an FAQ merging scenario of an agent in which a branch tree is used.

FIG. 11 shows an example of a FAQ merging scenario of the agent in which a branch tree is used. The agent can create FAQs by using the dialog logs. The dialog logs used here are stored in the dialog log DB 220 of the agent client terminal 200-2. In FIG. 11, the agent categorizes help requests into four groups: (1) help requests received by being designated by the user, (2) help requests related to specific objects, (3) help requests related to general topics or contents, and (4) help requests to which the agent spontaneously responded in the virtual world. However, the help requests of 1 and 4 can be categorized into 2 or 3 depending on the follow-up questions or answers from the agent and the like. The agent can create its own FAQ for help requests by associating the four groups with the past dialog records of the agent and FAQ about specific objects.

Figure 12:
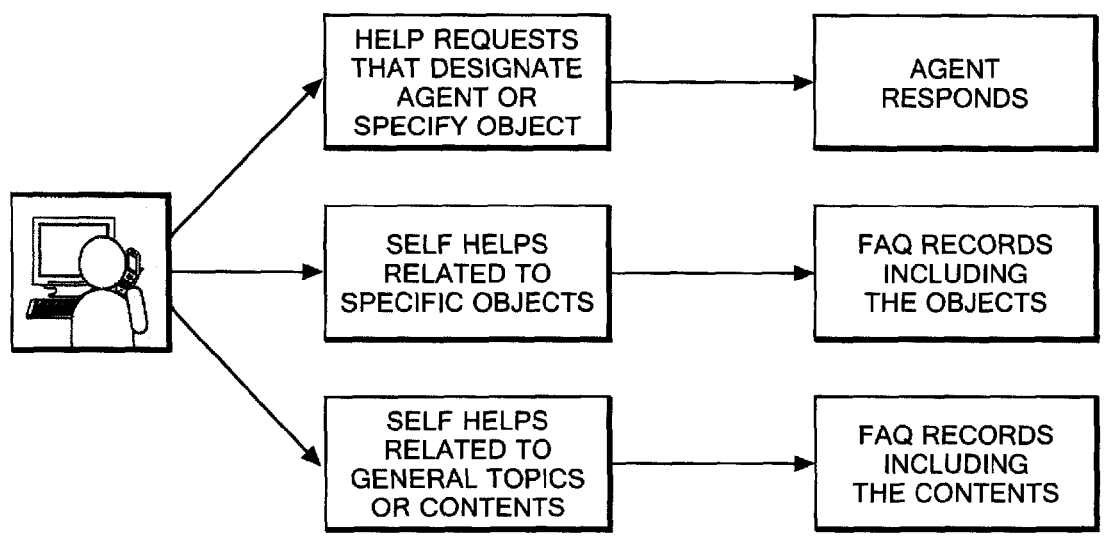
FIG. 12 shows an example of an FAQ merging scenario of a user in which a branch tree is used.

FIG. 12 also shows an example of a FAQ merging scenario of the user in which a branch tree is used. In FIG. 11, it is possible for the user to create FAQs by use of dialog logs. The dialog logs used are stored in the dialog log DB 220 of the user client terminal 200-1. In FIG. 12, the user categorizes actions upon occurrence of problems into three groups: (1) help requests that designate the agent or object, (2) self helps on specific objects, and (3) self helps on general topics or contents. Actions in group 1 cannot be associated with dialog logs and FAQ because the designated agent responds to the request. For actions in groups 2 and 3, the user can create its own FAQ for help requests by associating the specific objects with the FAQ.

The following are examples of the possible user actions in the present invention.

EXAMPLE 1

In order to make the action of the user or the agent a trigger for a help request, the action of the user or the agent and a dialog must be stored in association with each other when the dialog session management unit 111 obtains a dialog log. The action can be associated with only a start node of the dialog, or with each node. In this example, it is assumed that picking up a product "shoes" of a user 20 is associated with a start node of a dialog log. In addition, required is a processor for determining whether an action of a user or an agent is a help request, and the determining processor can be provided for the server 100 or the client terminal 200.

Figure 13:
FIG. 13 shows a scene where a user is picking up a product "shoes" displayed in a shop.

FIG. 13 shows a situation where the user 20 is picking up the product "shoes" displayed in a shop. The action of the user 20 in picking up the product "shoes" is a trigger to search for dialog logs. The user 20 and an agent 21 can then automatically obtain necessary information without having to make a dialog log search request by asking questions and the like. When dialog logs are searched for in the client terminal 200-2 of the agent 21 to obtain the relevant dialog logs with the trigger that the user 20 has picked up the product "shoes", the agent 21 can learn dialogs performed by other users who picked up the product "shoes" in the past. The agent 21 can move one step ahead of the user 20 to explain the product "shoes".

On the other hand, if dialog logs are searched for in the client terminal 200-1 of the user 20 with the trigger that the user 20 has picked up the product "the pair of shoes", the user 20 can obtain dialog logs about the product "shoes" performed by itself in the past. Because it is possible to learn the dialogs performed by itself in the past, the user 20 does not ask the agent 21 the same question. Furthermore, the user 20 can ask the agent 21 questions different from the previous time.

EXAMPLE 2

When the dialog session management unit 111 obtains dialog logs, the dialog and the action images of the user and the agent are stored in association with each other in order to play and show the action images. The action images of the user and the agent are associated with each node. In this example, it is assumed that the action images of a user, who do not know how to operate a game machine 24 and asks an agent questions, are stored.

Figure 14:
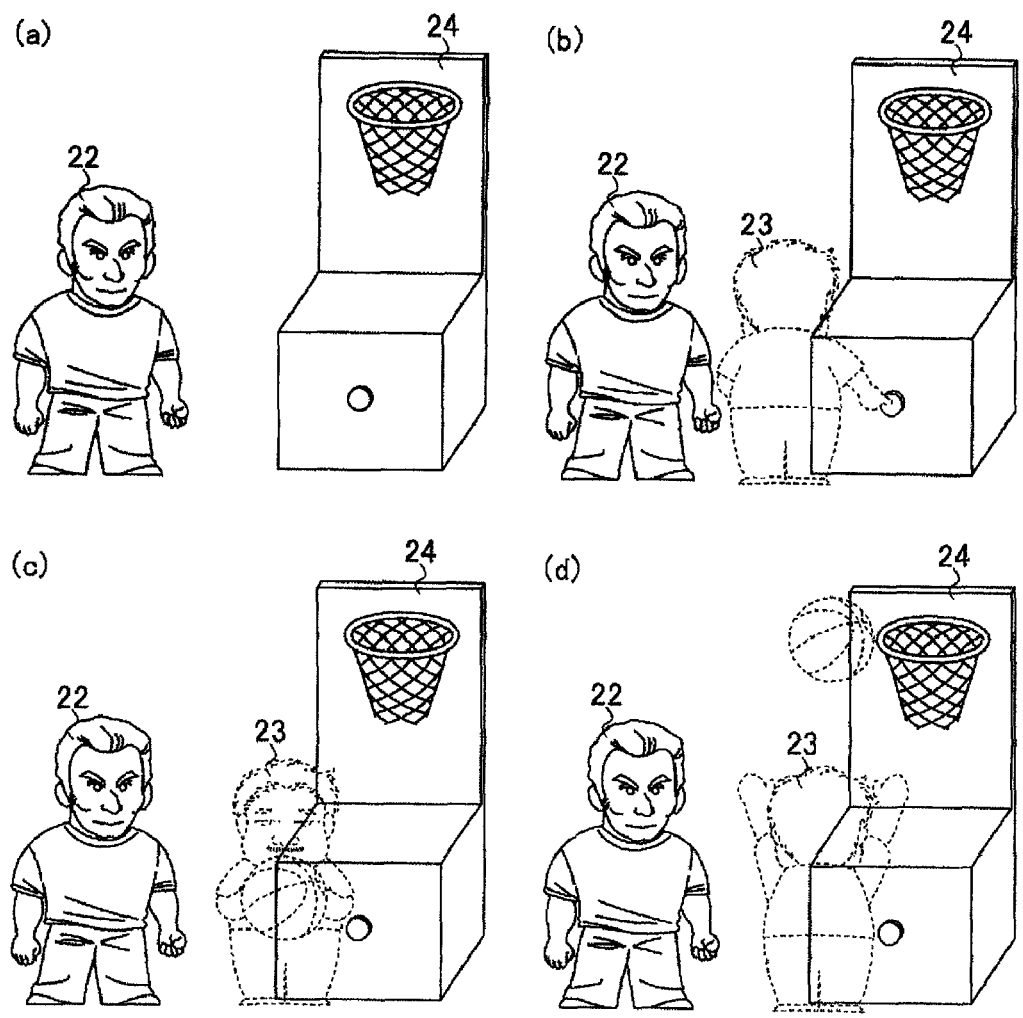
FIG. 14 explains an operation method of a game machine by playing back the past action of a user.

FIG. 14 explains the operation method of the game machine 24 by playing the past action of a user 23. FIG. 14A shows that a user 22 is in front of the game machine 24. Not knowing how to operate the game machine 24, the user 22 makes a dialog log search. Here, the dialog log search can be made while an agent is designated, or may be made by the user 22. Assuming that the user 22 makes the search, the "game machine 24" is set as a search condition to search for dialog logs. As described in the first example, it is possible to automatically search for dialog logs by the user 22 touching the game machine 24.

It is assumed that three moving images are attached to the obtained dialog logs. FIG. 14B shows a screen where the user 22 plays the first moving image. In the first moving image, the user 23 is pressing a button of the game machine. This action is made by the user 23 when the user 23, who asked a question of "How can I use the game machine 24?", follows an answer of "Please press the button on the front of the game machine" given by an agent. The moving image is stored in a dialog log while being associated with the answer of the agent.

FIG. 14C shows a screen where the user 22 plays the second moving image. In the second moving image, the user 23 is picking up a ball that has come out of the game machine. This action is made by the user 23 when the user 23, who subsequently asked a question of "What should I do next?", follows an answer of "Please pick up a ball" given by an agent. The second moving image is stored in a dialog log while being associated with the answer of the agent like the first moving image.

FIG. 14D shows a screen where the user of the user 22 plays the third moving image. In the third moving image, the user 23 shoots the ball, which has been held in its hand, towards the net. This action is made by the user 23 when the user 23, who further asked a question of "What should I do with the ball?", follows an answer of "Please shoot the ball towards the net of the game machine 24" given by the agent. The third moving image is stored in a dialog log while being associated with the answer of the agent like the first and second moving images. In this manner, by watching the actions of users who made similar help requests in the past in moving images, it is possible to obtain answers to help requests where the answers are easier to understand than just an explanation. It is also possible to provide a self-assist function by associating dialog logs with moving images.

Figure 15:
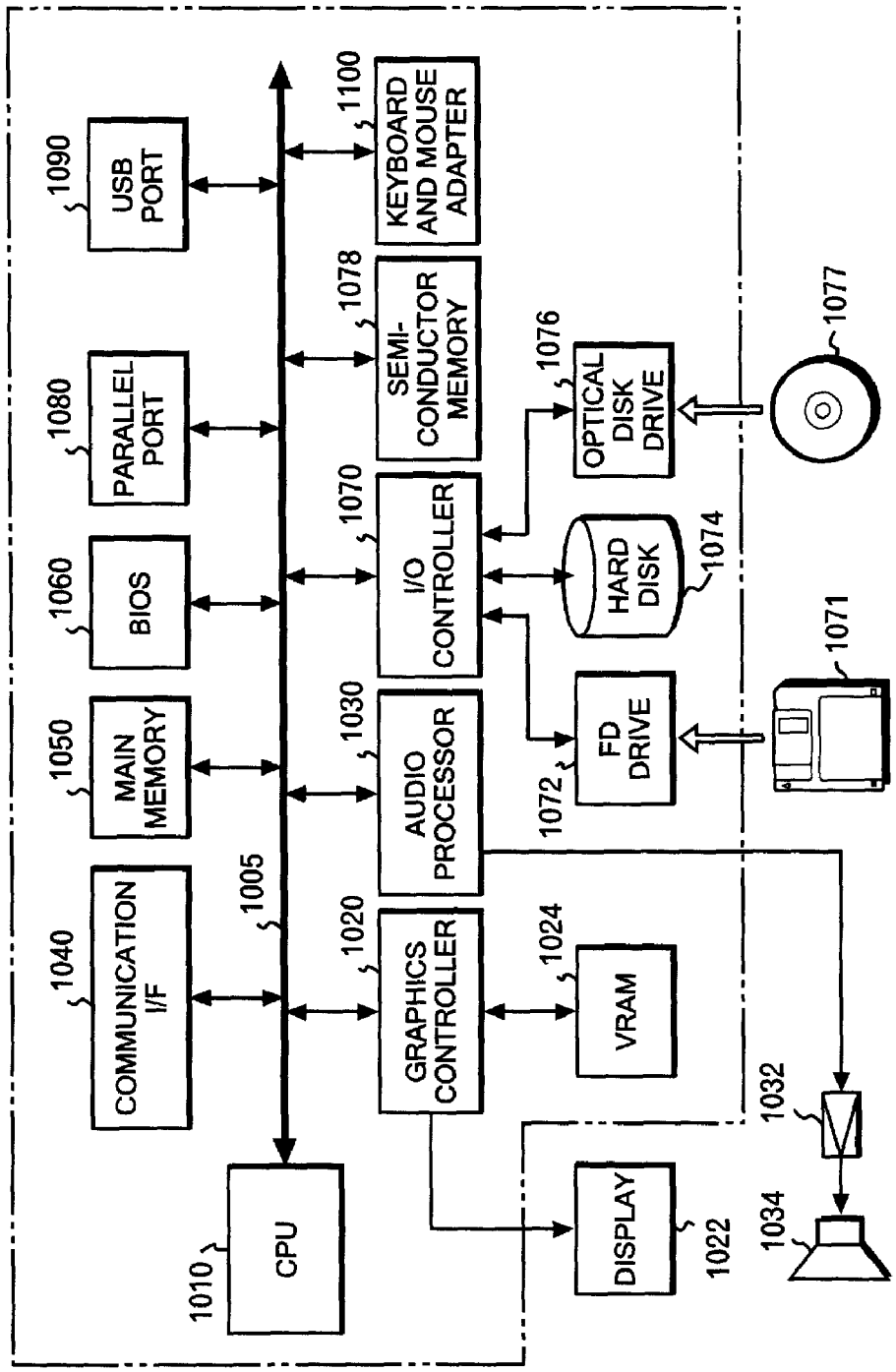
FIG. 15 shows an information processor as a typical hardware configuration example of a server.

FIG. 15 shows an information processor 400 as a typical hardware configuration example of the server 100 described in FIG. 2. An example of a hardware configuration of the information processor 400 is shown hereunder. The information processor 400 includes a central processing unit (CPU) 1010, a bus line 1005, a communication I/F 1040, a main memory 1050, a basic input output system (BIOS) 1060, a parallel port 1080, a USB port 1090, a graphic controller 1020, a VRAM 1024, an audio processor 1030, an I/O controller 1070, and an input means such as a keyboard, a mouse and adaptor. The I/O controller 1070 can be connected to storage media such as a flexible disk (FD) drive 1072, a hard disk 1074, an optical disk drive 1076, and a semiconductor memory 1078.

The audio processor 1030 is connected to an amplifying circuit 1032 and a speaker 1034. In addition, the graphic controller 1020 is connected to a display 1022.

The BIOS 1060 stores a boot program executed by the CPU 1010 upon the activation of the information processor 400, a program dependent on the hardware of the information processor 400, and the like. The flexible disk (FD) drive 1072 reads programs or data off the flexible disk 1071, and provides them to the main memory 1050 or the hard disk 1074 through the I/O controller 1070.

As the optical disk drive 1076, a DVD-ROM drive, a CD-ROM drive, a DVD-RAM drive, and a CD-RAM drive, for example, are usable. At this point, it is necessary to use an optical disk 1077 that corresponds to a drive being used. The optical disk drive 1076 can also read programs or data off the optical disk 1077, and provide them to the main memory 1050 or the hard disk 1074 through the I/O controller 1070.

Computer programs provided to the information processor 400 are provided by users while being stored in storage media such as the flexible disk 1071, the optical disk 1077, or a memory card. The computer programs are read off storage media through the I/O controller 1070, or are downloaded through the communication I/F 1040, to be installed in the information processor 400. Because the operations that the computer programs cause the information processor to perform are the same as those in the processor already described, the description thereof will be omitted.

The above computer programs can be stored in an external storage medium. As a storage medium, a magneto-optical storage medium such as an MD and a tape medium are usable, other than the flexible disk 1071, the optical disk 1077, or a memory card. Furthermore, the computer programs can be provided to the information processor through communication line by using, as storage media, storages such as a hard disk or an optical disk library, which are provided in a server system connected to a dedicated communication line or the Internet.

The descriptions given in the above example is mainly of the information processor 400. Alternatively, it is possible to serve a function similar to the above-described information processor by installing, in a computer, a program having a function described for the information processor, and causing the computer to operate as an information processor. Therefore, the information processor described as one embodiment of the present invention can be implemented by a method and a computer program thereof.

An apparatus of the present invention can be implemented as hardware, software, or a combination of hardware and software. A typical example for implementation with the combination of hardware and software is an implementation with a computer system having a specified program. In such a case, the specified program causes a computer system to execute the processing according to the present invention by being loaded into the computer system to be executed. The program is configured of an instruction set which can be represented by an arbitrary language, code, or notation. Such an instruction set enables a system to directly execute a specified function, or to execute the function after any one or both of: (1) conversion into another language, code, or notation, and (2) replication to another medium is executed. Accordingly, a program product including a medium which stores the program is also included in the present invention. A program executing the functions of the present invention can be stored in a medium which can be read off by an arbitrary computer, such as a flexible disk, an MO, a CD-ROM, a DVD, a hard disk device, a ROM, an MRAM, and a RAM. Such a program can be downloaded from another computer system connected by a communication line or can be replicated from another medium in order to store in a computer-readable medium. Moreover, the program can be stored in a single by being compressed or can be store in a plurality of storage media by being divided into some.

The present invention provides a personal service support method, system, apparatus and computer program for assisting inquiries about user operations by use of dialog records of users' inquiries and agents' answers to the inquiries, where the dialog records are obtained in a virtual world and edited in a reusable form.

The present invention is not limited to the above-mentioned embodiments. Additionally, the effects described in the embodiments of the present invention are simply listed as the most favorable effects produced by the present invention, and the effects of the present invention is not limited to those described in the embodiments or example of the present invention.

We claim:

1. A computer-implemented personal service support method for assisting an inquiry about a user operation in a virtual world, the method comprising the steps of:

storing a dialog between a user and an agent, by a processor, wherein said agent answers said inquiry about the user operation to produce a stored dialog;

identifying a common node present in both said stored dialog and an additional dialog, by the processor, wherein said stored dialog and said additional dialog have a list structure in which dialog units of said user and said agent are set as nodes;

connecting said stored dialog in said list structure with said additional dialog in said list structure, by the processor, to produce a created dialog in a branch tree structure, wherein said created dialog in said branch tree structure is created by merging said common node, and merging said common node comprises connecting said list structure below the common node in said stored dialog to a position below the common node in said additional dialog, or connecting said list structure below the common node in said additional dialog to a position below the common node in said stored dialog; and recording said created dialog in said branch tree structure, by the processor, thereby assisting an inquiry about user operation in said virtual world.

2. The computer-implemented method according to claim 1, further comprising the step of:

searching said stored dialog in said branch tree structure, according to a certain condition requested by said user or said agent.

3. The computer-implemented method according to claim 1, wherein:

said information on each of said nodes contains structured information on a content and situation of said stored dialog and said additional dialog; and a certain condition requested by said user or said agent is about said structured information on said content and situation of said dialog.

4. The computer-implemented method according to claim 3, wherein said structured information contains information on an object around said user and said agent in said virtual world.

5. The computer-implemented method according to claim 3, wherein said step of creating a dialog in said branch tree structure further comprises:

inserting a second dialog between two consecutive nodes of a first dialog to create a new dialog in said branch tree structure, upon determining that said two consecutive nodes of said first dialog respectively contain a same structured information as start and end nodes of said second dialog.

6. The computer-implemented method according to claim 3, wherein said step of creating a dialog in said branch tree structure further comprises:

creating a parent node and setting start nodes of a first dialog and a second dialog as child nodes, upon determining that said start nodes contain a same structured information; and connecting said first and second dialogs at said parent node to create a new dialog in said branch tree structure.

7. The computer-implemented method according to claim 1, wherein said common node contains content corresponding to one of a same reply or a same question from said agent.

8. The computer-implemented method according to claim 1, further comprising:

adding a header to said created dialog, wherein said header contains content associated with a start node of said stored dialog and a start node of said additional dialog; and removing said start node from said stored dialog and said start node from said additional dialog upon adding said header to said created dialog.

9. A non-transitory computer-readable storage medium tangibly embodying instructions of a method which when implemented causes a computer to execute the steps of:

storing a dialog between a user and an agent, wherein said agent answers an inquiry about a user operation to produce a stored dialog;

identifying a common node present in both said stored dialog and an additional dialog, wherein said stored dialog and said additional dialog have a list structure in which dialog units of said user and said agent are set as nodes;

connecting said stored dialog in said list structure with said additional dialog in said list structure to produce a created dialog in a branch tree structure, wherein said created dialog in said branch tree structure is created by merging said common node, and merging said common node comprises connecting said list structure below the common node in said stored dialog to a position below the common node in said additional dialog, or connecting said list structure below the common node in said additional dialog to a position below the common node in said stored dialog; and recording said created dialog in said branch tree structure.

10. A personal service support system for assisting an inquiry about a user operation in a virtual world, the system comprising:

a dialog storage unit, disposed in a memory, which stores a dialog between a user and an agent, wherein said agent answers said inquiry about said user operation; and a dialog creating unit, disposed in the memory, which identifies a common node present in both said stored dialog and an additional dialog, wherein said stored dialog and said additional dialog have a list structure in which dialog units of said user and said agent are set to nodes, and connects said stored dialog in said list structure with said additional dialog in said list structure to produce a created dialog in a branch tree structure, wherein said created dialog in said branch tree structure is created by merging said common node, and merging said common node comprises connecting said list structure below the common node in said stored dialog to a position below the common node in said additional dialog, or connecting said list structure below the common node in said additional dialog to a position below the common node in said stored dialog, wherein said dialog storage unit stores said created dialog in said branch tree structure.

11. The personal service support system according to claim 10, further comprising:

a dialog search unit which searches said dialog storage unit for said dialogs in said branch tree structure according to a certain condition requested by said user or said agent to produce a certain structured information.

12. The personal service support system according to claim 11, wherein:

said dialog storage unit stores said structured information on a content and situation of said dialogs as information on said nodes; and said dialog search unit searches said dialogs by using said certain structured information as a search condition by said user or said agent.

13. The personal service support system according to claim 12, wherein said dialog storage unit stores information on objects around said user and said agent in said virtual world as said structured information.

14. The personal service support system according to claim 12, wherein said dialog creating unit inserts a second dialog between two consecutive nodes of a first dialog to create a new dialog in said branch tree structure, upon determining that said two consecutive nodes of said first dialog respectively contain a same structured information as start and end nodes of said second dialog.

15. The personal service support system according to claim 12, wherein said dialog creating unit (i) creates a parent node and sets start nodes of a first dialog and a second dialog as child nodes upon determining that said start nodes contain a same structured information, and (ii) connects said first and second dialogs at said parent node to create a new dialog in said branch tree structure.

16. The personal service support system according to claim 10, further comprising:
a receiver unit which receives a dialog between the user and the agent, wherein said agent answers said inquiry about user operation.

17. The system according to claim 16, wherein said dialog creating unit produces the created dialog based on (i) said received dialog having said list structure in which utterance units of said user and said agent are set as nodes and (ii) on the information on said nodes.

18. The system according to claim 17, further comprising:
a dialog storage unit which stores said created dialog between said agent and said user in said branch tree structure.

* * * * *